W. J. DRIVER.
Bee-Hive.
No. 212,594.  Patented Feb. 25, 1879.
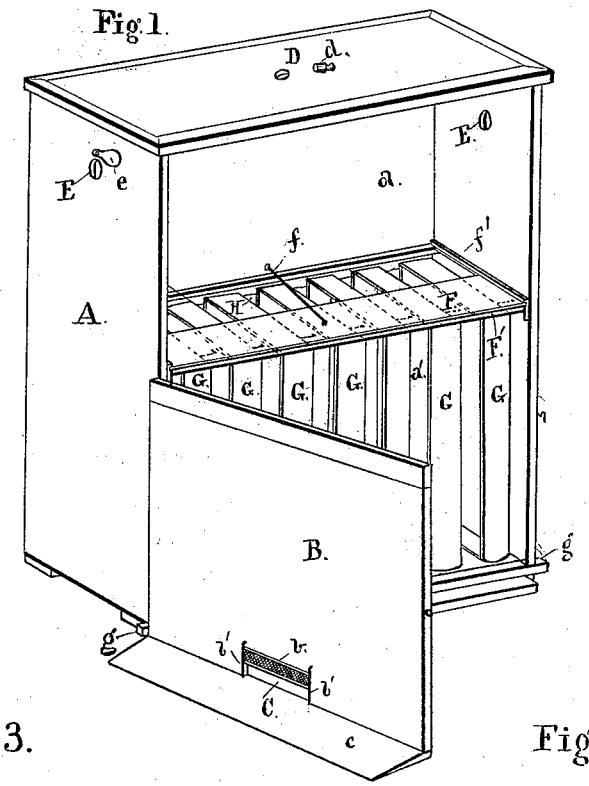
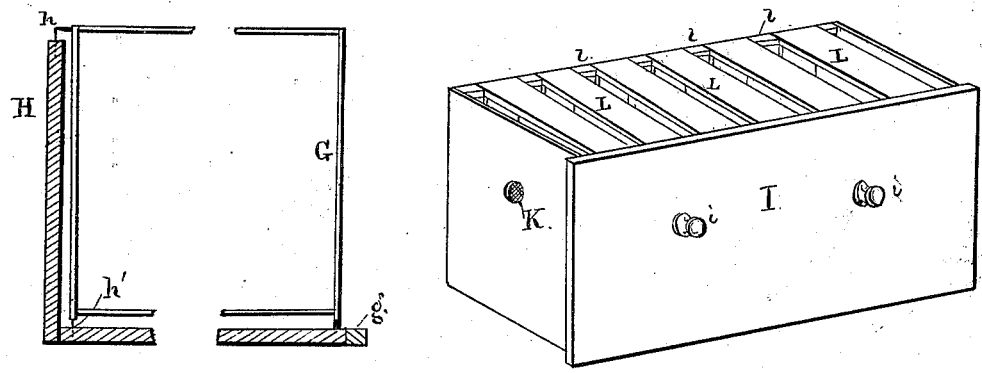
Witnesses,
W. A. Bertram
D. H. Barclay
Inventor
W. J. Driver
by
R. D. Williams
Attorney.

UNITED STATES PATENT OFFICE.

WILLIAM J. DRIVER, OF FREE UNION, KENTUCKY.

IMPROVEMENT IN BEE-HIVES.

Specification forming part of Letters Patent No. 212,594, dated February 25, 1879; application filed July 10, 1878.

*To all whom it may concern:*

Be it known that I, WILLIAM J. DRIVER, of Free Union, Webster county, State of Kentucky, have invented certain new and useful Improvements in Bee-Hives; and I hereby declare the same to be fully, clearly, and exactly described as follows, reference being had to the accompanying drawings, in which—

Figure 1 is a perspective view of the hive, the honey-chamber being removed. Fig. 2 is a similar view of the honey-chamber; and Fig. 3 is a vertical sectional view of the removable portion of the brood-chamber, as hereinafter described.

In the accompanying drawings, A represents the hive proper, consisting of a honey-chamber, $a$, and brood-chamber $a'$. The hive is of an appropriate size, preferably rectangular in cross-section, and is provided with perforations E E, having closing-pieces $e$ at either side, and a hole, D, fitted with a suitable plug, $d$, at the top.

About midway upon the sides of the hive are secured, internally, strips $f'$, having a groove, as shown, within which the partition F is adapted to slide, the same being provided with a wire, $f$, extending through a hole at the back of the hive. The partition F is of a width equal to half the depth of the hive, and rests over a permanent partition, F', of similar width.

The honey-chamber consists of a drawer, I, (see Fig. 2,) open at top and bottom, its front being provided with knobs $i\ i$, for withdrawing it from the hive. The sides of the drawer are perforated, as shown at K, the said perforations being covered with wire-gauze and registering with the openings E when the drawer is in place within the hive. L L represent rectangular frames, which rest between cleats $l\ l$, formed upon the edge of the drawer.

The brood-chamber consists of a back, H, and bottom, the latter having projections $g\ g$, for withdrawing it from the hive. G G represent rectangular frames, which swing within the brood-chamber, being mounted upon pintles $h$ and pins $h'$, as shown in Fig. 3.

The door B of the hive is hinged thereto, and is furnished with a suitable catch for securing it in place. An entrance, C, for the bees is formed in the lower portion of the door, and is adapted to be closed, if desired, by a wire-gauze partition, $b$, sliding upon rods $b'$. A suitable porch, $c$, is attached to the lower portion of the door.

The operation of the device will have been evident from the foregoing description of its construction. When it is desired to remove the honey, the plug $d$ is removed and smoke is blown through the hole D. The bees being thereby driven into the brood-chamber, the partition F is drawn back, cutting off communication between the two parts of the hive. The drawer I may be then drawn out and one or more of the frames L removed. Should it be desired to move the hive from place to place, the gauze door $b$ is lowered, preventing the egress of the bees, while still affording light and air. As the openings K register with the holes E, the honey-chamber is amply illuminated, and the amount of light may readily be regulated by means of the covers $e$.

The frames G in the brood-chamber being pivoted, as shown, and being free to swing, ready means of access is afforded to the brood-chamber when it is desired to clear it.

Having thus described my invention, what I claim as new, and desire to secure by Letters Patent, is—

The hive A, having orifice D, provided with a suitable plug, and the openings E, having hinged covers, as shown, and the honey-drawer and brood-chamber, having pivoted slats, the latter provided with entrance C, with gauze door $b$, substantially as described.

W. J. DRIVER.

Attest:
JOHN G. BAILEY,
JNO. D. HILL.